United States Patent [19]

Gardner et al.

[11] Patent Number: 5,658,159

[45] Date of Patent: Aug. 19, 1997

[54] CONNECTOR SYSTEM AND METHODS

[75] Inventors: Donald E. Gardner, Petaluma; Robert F. Buckheit, Santa Rosa, both of Calif.

[73] Assignee: BIW Connector Systems, Inc., Santa Rosa, Calif.

[21] Appl. No.: 548,993

[22] Filed: Oct. 27, 1995

[51] Int. Cl.⁶ .................................................. H01R 13/28
[52] U.S. Cl. ........................... 439/294; 439/191; 285/71; 213/76
[58] Field of Search ........................ 439/191, 194, 439/195, 294, 293, 312, 256; 285/70, 71, 72; 213/76, 1.3

[56] References Cited

U.S. PATENT DOCUMENTS

| | | | |
|---|---|---|---|
| 420,810 | 2/1890 | Lelana | 285/72 |
| 2,193,199 | 3/1940 | McKee | 285/70 |
| 3,271,726 | 9/1966 | Pfendler | 439/294 |
| 3,491,899 | 1/1970 | Cope | 213/159 |
| 3,532,228 | 10/1970 | Beyer | 213/212 |
| 3,591,017 | 7/1971 | Cope | 213/56 |
| 3,773,186 | 11/1973 | Reno et al. | 213/76 |
| 3,802,578 | 4/1974 | Farnworth | 213/76 |
| 4,913,657 | 4/1990 | Nawto et al. | 439/194 |

FOREIGN PATENT DOCUMENTS

| | | |
|---|---|---|
| 0 423 548 A1 | 4/1991 | European Pat. Off. .......... B61G 5/08 |
| 1524562 | 11/1968 | France . |
| 1170990 | 5/1964 | Germany . |
| 1242669 | 6/1967 | Germany . |
| 455332 | 10/1936 | United Kingdom . |

*Primary Examiner*—Neil Abrams
*Assistant Examiner*—T. C. Patel
*Attorney, Agent, or Firm*—Townsend and Townsend and Crew LLP

[57] ABSTRACT

The invention provides a connector system and methods for attaching a first and second connector. Each connector includes an elongate connector body and a coupling nut rotatably coupled about the connector body. Each coupling nut includes a center plate and a pair of latch arms, with each arm having a groove therein to define a tooth at a distal end of each arm. The arms are substantially parallel to the connector body. Each connector further includes at least one resilient member which resists movement of the arms away from their parallel orientation relative to the elongate body. The first and second connectors may be connected by abutting the connector bodies and rotating the coupling nuts so that the grooves and teeth of corresponding arms mate with each other.

47 Claims, 5 Drawing Sheets

CONNECTOR SYSTEM AND METHODS

BACKGROUND OF THE INVENTION

This invention relates generally to the field of connectors, and more particularly to connectors which may be coupled and uncoupled by hand or which may be uncoupled by pulling apart the connectors with a prescribed force. In one specific application, the invention relates to connectors which may be used to connect air lines and/or electrical signal and power lines for a rail car braking system.

Current braking systems used on most freight trains in the United States are based on a technology that was developed almost one hundred years ago. Such systems rely on the use of pressurized air to both control and power the brakes. In order to supply pressurized air to the rail cars, an air line is provided along each rail car. When the rail cars are connected, each air line is coupled together to form a single air line running the length of the train. The coupling mechanism generally employed to join each air line is commonly referred to as a "gladhand" coupling and has remained substantially unchanged over the last century.

To connect a pair of gladhand couplings, the couplings are abutted adjacent each other and the couplings are rotated in opposite directions until sufficiently engaged. The gladhand couplings each contain a 90 degree bend through which air must travel when passing through the connection. To prevent the couplings from disconnecting when subjected to vibration, some have incorporated a locking device which locks the couplings together after they have been joined.

Although gladhand couplings have been generally successful in coupling air lines of conventional pneumatic braking systems, such systems suffer from significant drawbacks which have prompted the development of newer systems. More particularly, with such pneumatic systems braking time is affected by the speed with which air pressure changes travel along the train. For trains having large numbers of rail cars, a significant delay may be experienced while the compressed air passes the entire length of the train. To compensate for this delay, trains require a longer stopping time and may also be prematurely or overly slowed in order to ensure a safe operating speed.

Recently, a new braking system has been proposed and is referred to as an Electrically-Controlled-Pneumatic (ECP) braking system. The ECP braking system relies on air to power the brakes, but controls actuation of the brakes electronically. Hence, to operate the ECP braking system, each rail car must be provided not only with compressed air but also with an electrical power or signal line. Gladhand couplings are ill-suited for connecting both air and electrical lines since the gladhand couplings are rotated to join the couplings.

It would therefore be desirable to provide methods, systems, and apparatus for coupling various lines, particularly air and/or electrical lines (including both signal and power lines). Such methods, systems, and apparatus should allow such lines to be easily coupled and uncoupled, particularly by hand. In the case of rail cars, it would be desirable to provide connectors which could be coupled without rotating any electrical contacts. It would further be desirable if such connectors could be axially pulled apart at a prescribed force. It would be still further desirable if such connectors would remain connected when subjected to significant vibration. Such connectors should also be hermaphroditic so one connector may be interchangeably connected with any other connector.

SUMMARY OF THE INVENTION

The invention provides an exemplary connector which may be connected to another substantially identical connector to form a connector system. Such a connector system includes a first and a second connector, with each connector having an elongate connector body and a coupling nut rotatably coupled about the connector body. Each coupling nut comprises a center plate and a pair of latch arms. Each latch arm is provided with a groove which defines a tooth at a distal end of each arm. The arms are substantially parallel to the connector body, and at least one resilient member is provided to resist movement of the arms away from their parallel orientation relative to the connector body. In this manner, the first and second connectors may be connected by abutting the connector bodies and rotating the coupling nuts so that the grooves and teeth of corresponding arms mate with each other. To disconnect the first and second connectors, the coupling nuts are rotated until the mating arms are separated from each other. Alternatively, the connectors may be disconnected by axially pulling the connectors away from each other to separate the mating arms. As the connectors are pulled away from each other, the resilient member is compressed to allow at least one of the latch arms to move from its parallel orientation relative to the connector body, thereby allowing the connectors to separate.

In one exemplary aspect, both coupling nuts are substantially identical to each other. In this manner, a connector may be used with a variety of connectors of the same design since each will have a substantially identical coupling nut. In another aspect, each of the arms is semi-cylindrical in geometry. Preferably, the groove in one arm of each of the connectors faces generally toward the connector body, and the groove in the other arm of each of the connectors faces generally away from the connector body. In still a further aspect, each connector preferably includes two halves which are defined by a central plane bisecting the connector body so that one half is a mateable image of the other half. In this manner, a connector system may be provided with a variety of connectors which will each mate with each other.

In yet another aspect of the connector system, each connector body has a lumen extending therethrough. A sealing member, such as a gasket, is further provided and is at least partially held within the lumen. The lumen preferably defines a passage way so that compressed air (or other fluid or free flowing material) can be passed through the connector system when the connectors are coupled together. In one particular aspect, each groove is pitched so that the connectors will be drawn together when the connectors are coupled together. Each connector body will preferably be connected to a hose, with the lumen of the connector body being aligned with the hose.

In one particular aspect of the system, the latch arms of each connector are rigidly attached to the center plate. With such a configuration, the resilient member may be disposed between at least one of the arms and the connector body of each connector. Alternatively, the resilient member may be disposed between the center plate and the connector body of each connector. In still a further alternative, the resilient member may be disposed adjacent a proximal face on the center plate. In an alternative aspect, the latch arms of each connector may be-pivotally attached to the center plate. With such an alternative, a pair of resilient members are preferably provided, with the resilient members comprising a spring between each arm and the center plate. The arms are preferably pivotally attached so that one arm may be pivoted in a direction generally toward the connector body, and the other arm may be pivoted in a direction generally away from the connector body.

In yet another aspect, the resilient member is sufficiently resilient so that the connectors will separate with a prescribed force which may be varied depending on the particular application. When used to connector rail car lines, such a force will preferably be greater than about 50 pounds when pulled axially away from each other. In another aspect, each connector body is provided with a pair of tabs and pair of slots which will mate when the connectors are coupled together. In still a further aspect, each connector body preferably includes at least one electrical contact which is a signal and/or a power contact. Optionally, each connector body may also be provided with at least one fiber-optic contact, an inductive coupler, a mechanical switch, a proximity switch, and the like. In one particularly preferable aspect, each connector is operably attached to a rail car.

The invention provides an exemplary method for coupling a pair of connectors. According to the method, a first and a second connector are provided, with each connector comprising a connector body and a coupling nut rotatably coupled about the connector body. Each coupling nut includes a center plate and a pair of latch arms, with each arm having a groove therein to define a tooth at a distal end of each arm. The arms are substantially parallel to the connector body, and at least one resilient member is provided which resists movement of the arms away from their parallel orientation relative to the connector body. To couple the connectors, the connector bodies of each connector are abutted. Each coupling nut is then rotated in an opposite direction until the grooves and teeth of corresponding arms mate with each other.

In another aspect of the method, the coupling nuts are rotated in opposite directions until the mating arms are separated from each other to uncouple the connectors. Alternatively, the connectors may be axially pulled away from each other to separate the mating arms and to uncoupled the connectors. Preferably, the connectors will remain coupled until a prescribed axial force is applied to the connectors. When used to connect lines on rail cars, such a force will preferably be greater than about 50 pounds.

In a further aspect of the method, the connector body has a lumen extending therethrough, and a hose is connected to each connector body, with the lumen being aligned with the hose. With such a configuration, compressed air (or another fluid) is passed through the hoses. Each connector body preferably also includes at least one electrical contact which is mated with a corresponding contact when the connectors are coupled. In an exemplary aspect, each hose is preferably connected to a rail car, and the rail cars are positioned in close proximity to each other before coupling the connectors.

DETAILED DESCRIPTION OF THE SPECIFIC EMBODIMENTS

The invention provides methods, systems, and apparatus for coupling various lines such as air lines, electrical lines, fiber-optic lines, and the like. The methods, systems, and apparatus allow for such lines to be easily coupled and uncoupled by hand. In addition, such lines may be uncoupled by axially pulling apart the lines to separate the lines at a prescribed force without damage to the lines. The connection between the lines is sufficiently stable so that lines will not become disconnected, even when subjected to significant vibration. Although the methods, systems, and apparatus may be employed to connect a variety of lines, they will find their greatest use in connecting air and electrical lines used in conventional pneumatic or in electrically-controlled-pneumatic (ECP) braking systems employed by the railroad industry. For convenience of discussion, the connectors of the present invention will be described with reference to freight trains employing ECP braking systems. However, it will be understood that the invention may be useful in a variety of other applications.

Figure 1:
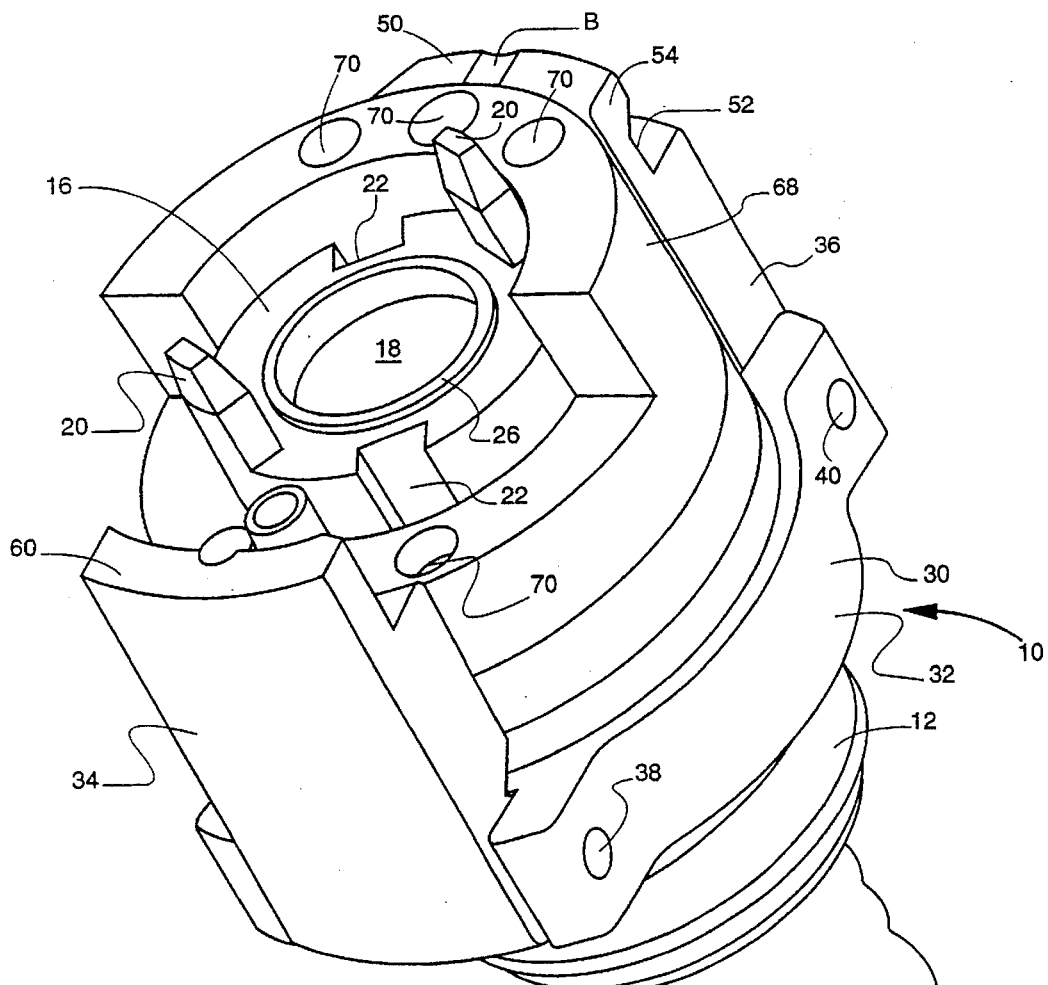
FIG. 1 is a perspective view of an exemplary connector according to the present invention.
Figure 2:
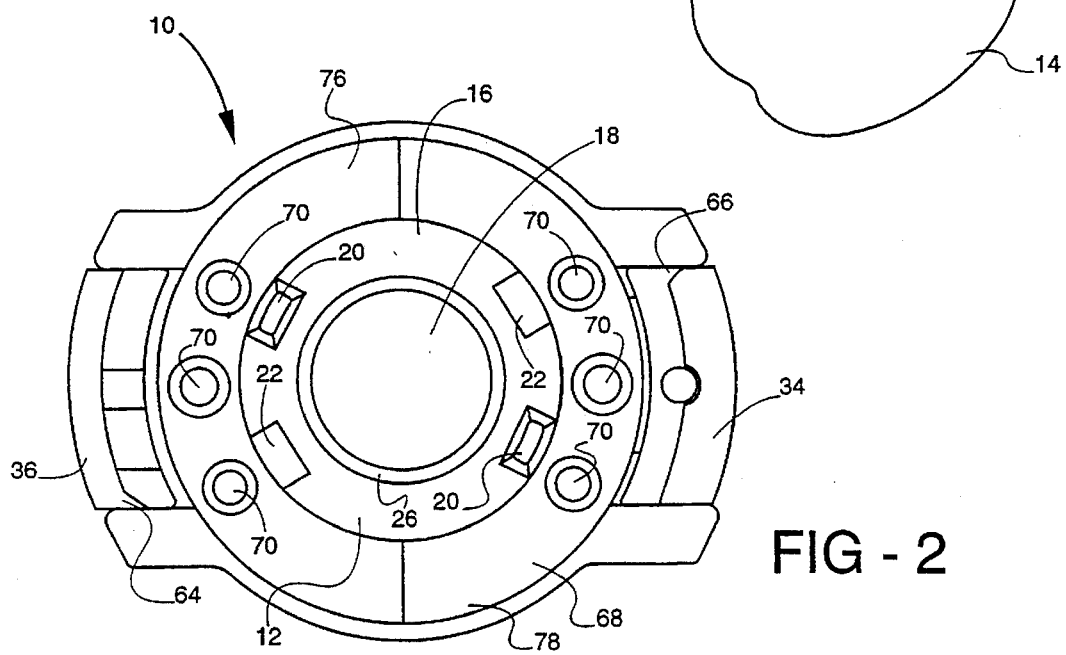
FIG. 2 is a front end view of the connector of FIG. 1.

Referring now to FIGS. 1 and 2, an exemplary embodiment of a connector 10 will be described. The connector 10 includes a connector body 12 having a proximal end 14, a distal end 16, and an axial lumen 18 extending therethrough. The connector body 12 is shown removed from the connector in FIG. 7 and further includes a pair of tabs 20 and a pair of slots 22. The tabs 20 are configured to slide within corresponding slots of another connector, while the slots 22 are for receiving corresponding tabs from another connector. Tabs 20 and slots 22 act as a keying mechanism to orient the connector faces when the connectors are coupled together. Tabs 20 and slots 22 also assist in keeping the mated connectors rigidly aligned along the longitudinal axis.

Figure 7:
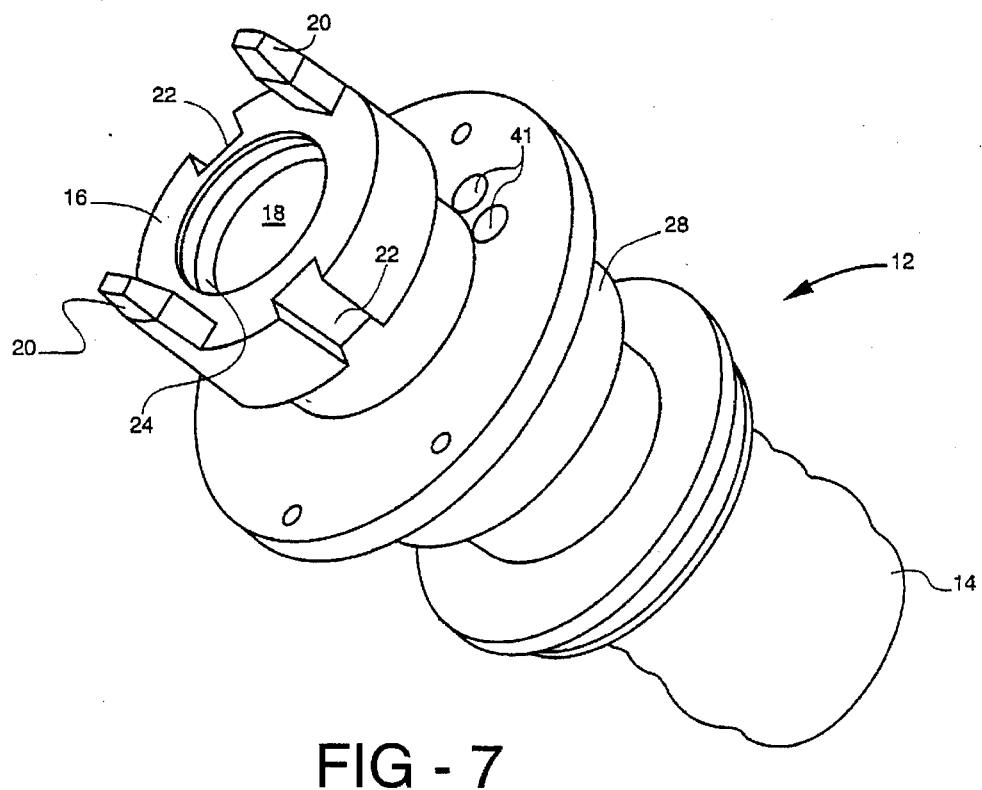
FIG. 7 is a perspective view of a connector body of the connector of FIG. 1.

The proximal end 14 is configured to receive a length of tubing, a hose, or the like which supplies compressed air to the train's brakes. Proximal end 14 may alternatively be threaded or otherwise configured to accommodate a mechanical connection. The distal end 16 includes a cylindrical groove 24 for receiving a resilient gasket 26 as shown in FIGS. 1 and 2. The gasket 26 will mate with a corresponding gasket from another connector when attached thereto. As the connectors are drawn together, the gasket 26 forms a seal between the connectors to prevent escape of compressed air between the connectors. As best shown in FIG. 7, the connector body 12 includes a cylindrical portion 28 over which a coupling nut 30 (see FIG. 1) is rotatably received. The coupling nut 30 includes a center plate 32 and a pair of latch arms 34, 36. Latch arms 34, 36 are pivotally attached to the center plate 32 by pins 38, 40, respectively. Connector body 12 further includes routing holes 41 for routing wires to contacts 72, 74 (see FIG. 8).

Figure 3:
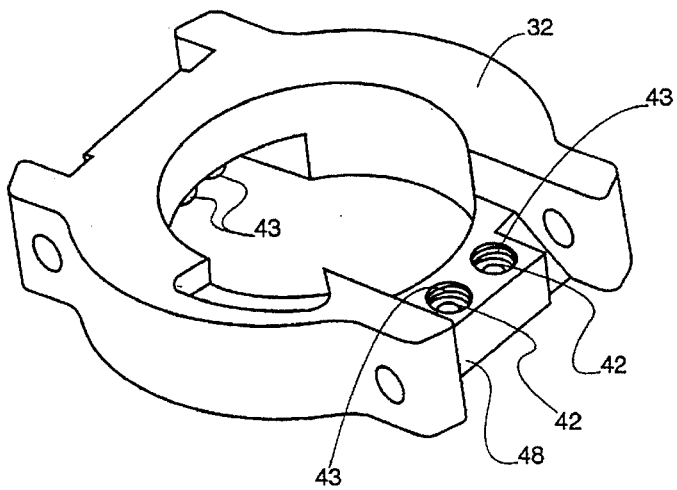
FIG. 3 is a perspective view of a center plate of a coupling nut of the connector of FIG. 1.

Construction of the center plate 32 and latch arms 34, 36 will be described in greater detail with reference to FIGS. 3–5. As shown in FIG. 3, the center plate 32 includes a pair of wells 42 on a right-hand side. The wells 42 are provided to receive a resilient member, such as springs 43, which press against a surface 44 (see FIG. 5) of latch arm 36. When the latch arm 36 is attached to the center plate 32, the arm 36 will be generally orthogonal to the center plate 32. The springs engage the surface 44 so that a surface 46 of the latch arm 36 engages a surface 48 of the center plate 32. The springs bias the latch arm 36 in this position to maintain the latch arm 36 in a generally orthogonal orientation relative to the center plate 32. When a force having an inwardly directed component is applied to a distal end 50 of the latch arm 36, the springs will compress allowing the distal end 50 to move from its orthogonal position relative to the center plate 32. The latch arm 36 includes a groove 52 and a tooth 54 at the distal end 50. With such a configuration, the latch arm 36 will mate with a latch arm from another connector that is configured, for example, essentially identical to latch arm 34, with the teeth and grooves of each arm interconnecting. When the connectors are pulled apart, a tooth of the mating connector will engage the tooth 54 of latch arm 36 to produce a force having an inwardly-directed component. Such a force will cause the springs to compress, thereby allowing the latch arm 36 to move radially inward, i.e. toward the connector body 12, from its orthogonal position relative to the center plate 32. In turn, this allows the tooth of the mating arm to slide over tooth 54 so that the connectors may disengage.

Figure 4:
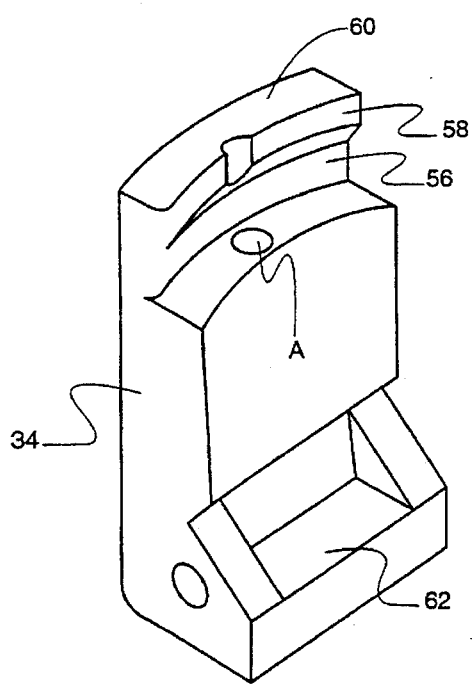
FIG. 4 is a perspective view of a latch arm of the coupling nut of FIG. 1 having an inwardly-facing groove.
Figure 5:
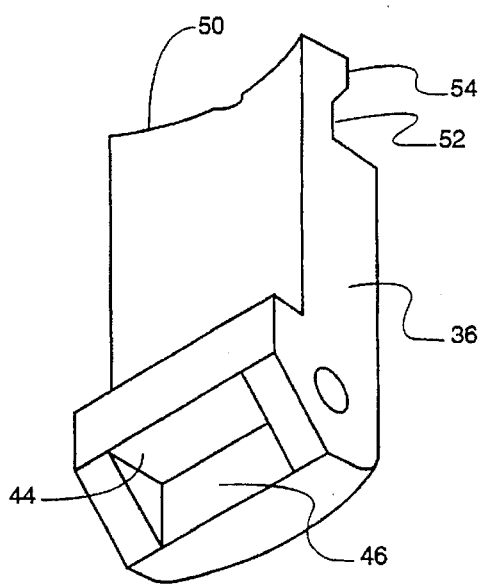
FIG. 5 is a perspective view of another latch arm of the coupling nut of FIG. 1 having an outwardly-facing groove.

As shown in FIG. 4, latch arm 34 includes a groove 56 and tooth 58 at a distal end 60. The groove 56 and tooth 58 are constructed to receive a mating tooth and groove from another connector, such as those of a latch arm which is substantially identical to latch arm 36. When latch arm 34 is attached to a left-hand side of the connector plate 32, a surface 62 engages a pair of springs 43 on the underside of latch plate 32. The springs are held within a pair of wells (not shown) that are essentially identical to the wells 42 on the right-hand side of center plate 32. The springs maintain latch plate 34 in a generally orthogonal orientation relative to center plate 32 in a manner similar to that previously described with latch arm 36. When latch arm 34 experiences a force having an outwardly directed component, the springs will compress to allow the distal end 60 to move radially outward, i.e. away from the connector body 12, from its orthogonal orientation relative to the center plate 32. In this manner, when the connector 10 is to be disengaged from another connector (by pulling the connectors axially apart), a tooth from a mating arm will engage tooth 58 to move latch arm 34 radially outward so that the teeth may disengage. Although shown to be semi-cylindrical in geometry, latch arms 34, 36 may have other geometries as well, such as a curved surface.

The coupling nut 30 is rotatable about the connector body 12 so that two connectors may be securely joined by abutting their distal ends and then rotating (preferably by hand) the coupling nut until the teeth on each of the latch arms are engaged. Similarly, the connectors may be disengaged by merely rotating the coupling nut 30 (preferably by hand) to disengage the latch arms. Optionally, teeth 54 and 58 may be provided with a pitch so that when the latch arms 34, 36 are engaged with the latch arms of another connector, the pitch will draw the connectors tightly together, forming a better seal at the gasket 26. When used with a pneumatic rail car braking system, the connectors will preferably form a seal that will hold at least 100 psi, and more preferably at least 200 psi. The coupling nut 32 may be formed of any sufficiently rigid and tough material, such as carbon, forged or stainless steel, iron, composites, and the like. Latch arms 34, 36 may optionally be provided with detents, grooves or ridges along the teeth to prevent premature release of the coupling nuts when subjected to substantial vibration. For example, as shown in FIG. 4, latch arm 34 may be provided with a hole A for holding a ball and spring (not shown). When the latch arms are engaged, the ball will snap into a detent B (see FIG. 1) in the mating latch arm 36. Optionally, as shown in FIG. 2, chamfers 64, 66 may be provided on the latch arms to facilitate coupling of the latch arms.

Figure 6:
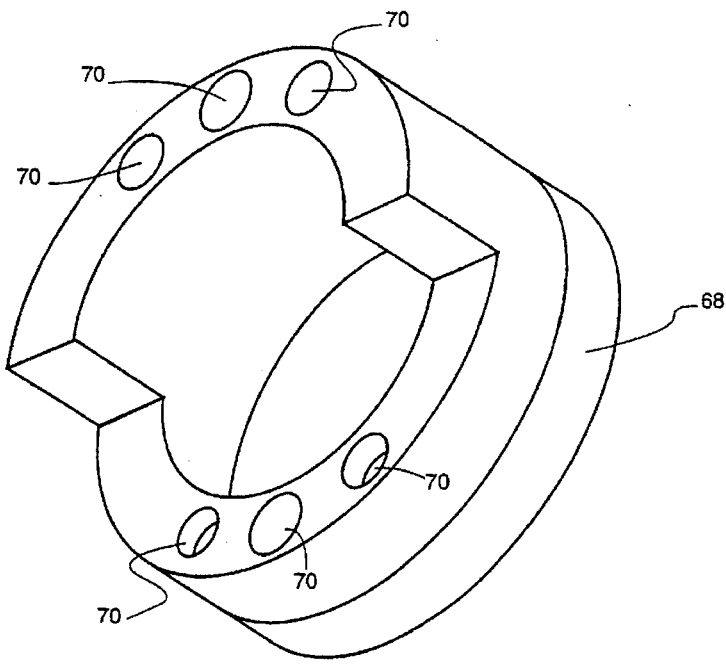
FIG. 6 is a perspective view of an electrical housing of the connector of FIG. 1 according to the present invention.
Figure 8:
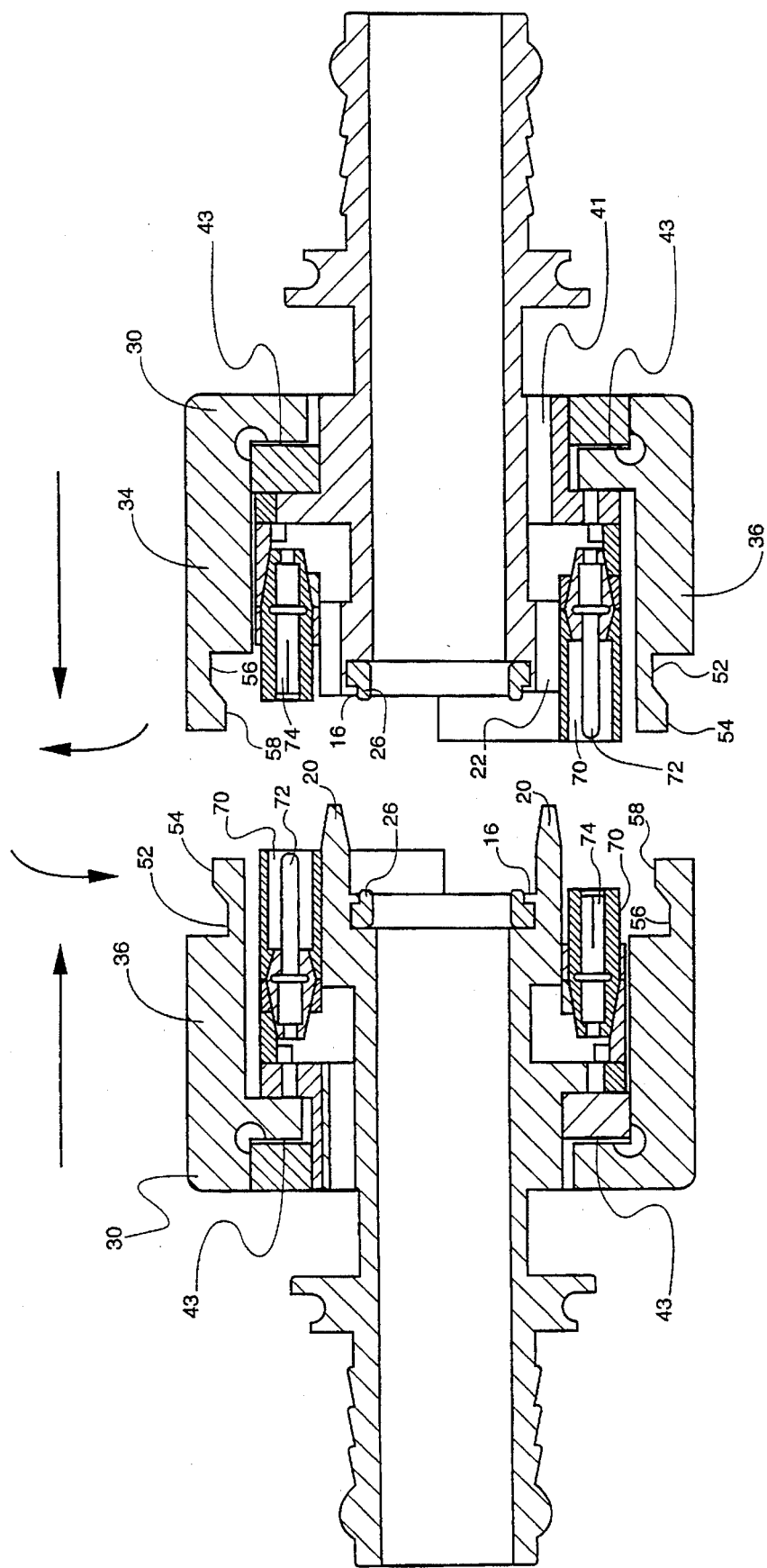
FIG. 8 is a cross-sectional side view of the connector of FIG. 1 positioned adjacent a substantially identical connector, such as when the connectors are to be coupled together.

Referring now to FIGS. 1, 2, and 6, the connector 10 further includes an electrical housing 68 in which electrical contacts may be provided. Housing 68 includes a plurality of lumens 70 through which a variety of electrical contacts may be placed. For example, the electrical contacts may be power and/or signal contacts. Optionally, a fiber-optic contact or other cable contact may be provided. As best shown in FIG. 8, lumen 70 may include a male contact 72 and a female contact 74. The contacts 72, 74 may be connected to conventional wiring so that power or electrical signals may be passed from car to car when the connectors are engaged.

Referring back to FIG. 2, the connector 10 may be divided (for purposes of convenience of discussion) into two halves, e.g. left side half 76 and right side half 78. The left-hand side 76 is a mateable image of the right-hand side 78. In other words, right-hand side 78 will mate with left-hand side 76. Such a construction is advantageous in that any connector 10 will engage with any other connector that is constructed essentially identical to the connector 10. Such a construction is useful with rail cars since each end of the rail car will be provided with a connector. In this manner, the connector at either end of the rail car will mate with any connector at either end of any other rail car.

Referring now to FIG. 8, attachment of two connectors 10 will be described. Initially, the distal end 16 of each connector body is positioned to face each other. The tabs 20 of each connector are then aligned with slots 22 of the other connector. The connectors 10 are then moved together as illustrated by the arrows. Coupling nuts 30 are then rotated as indicated by the arrows to engage teeth 54 into slots 56, while teeth 58 are received into slots 52. Also, contacts 72 are received into contacts 74. As the latch arms 34, 36 of each connector are placed in alignment, the connectors become securely coupled together.

As previously described, the connectors 10 may be disconnected in one of two ways. First, the coupling nuts 30 may be rotated in opposite directions to disengage the coupling nuts. Alternatively, the connectors 10 may be pulled axially away from each other causing latch arms 34 to move radially outward from the connector body 12 and latch arms 36 to move radially inward toward the connector body 12 so that the teeth on the latch arms may disengage and the connectors may be uncoupled.

Figure 9:
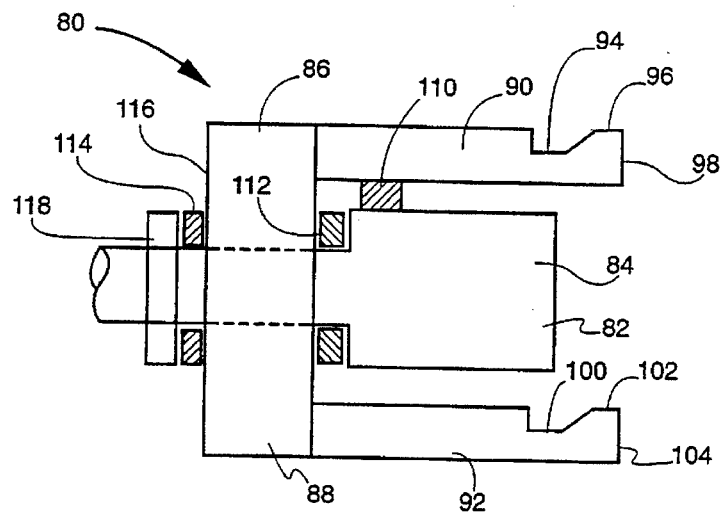
FIG. 9 is a side view of an alternative embodiment of a connector according to the present invention.
Figure 10:
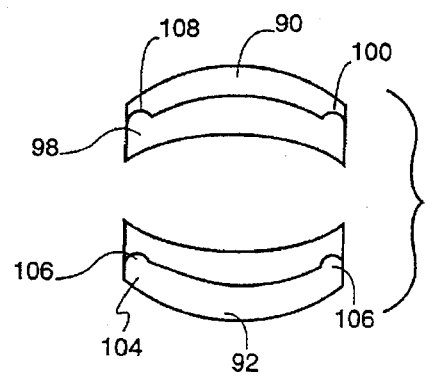
FIG. 10 is a front end view of a pair of latch arms of the connector of FIG. 9.

Referring to FIG. 9, an alternative embodiment of a connector 80 will be described. The connector 80 includes an elongate connector body 82 having a lumen (not shown) extending therethrough and a center plate 84. A coupling nut 86 is rotatably disposed about the connector body 82. The coupling nut 86 includes a center plate 88 and a pair of latch arms 90, 92. Latch arms 90, 92 are rigidly attached to center plate 88. Latch arm 90 includes a groove 94 and a tooth 96 at a distal end 98, and latch arm 92 includes a groove 100 and a tooth 102 at a distal end 104. As best shown in FIG. 10, latch arms 90, 92 are semi-cylindrical in geometry and are configured such that latch arm 90 will mate with latch arm 92 of another connector.

Two identical connectors may be coupled together by abutting the center sections 84 and rotating the coupling nuts 86 to engage the corresponding latch arms 90, 92 in a manner similar to the embodiment described in FIG. 1. Detents 106 are provided on latch arm 92 and engage detents 108 in latch arm 90 when two connectors are joined to prevent the coupling nuts from prematurely disengaging (such as when subjected to vibration). Such detents may alternatively be provided with the connector 10 of FIG. 1.

Figure 11:
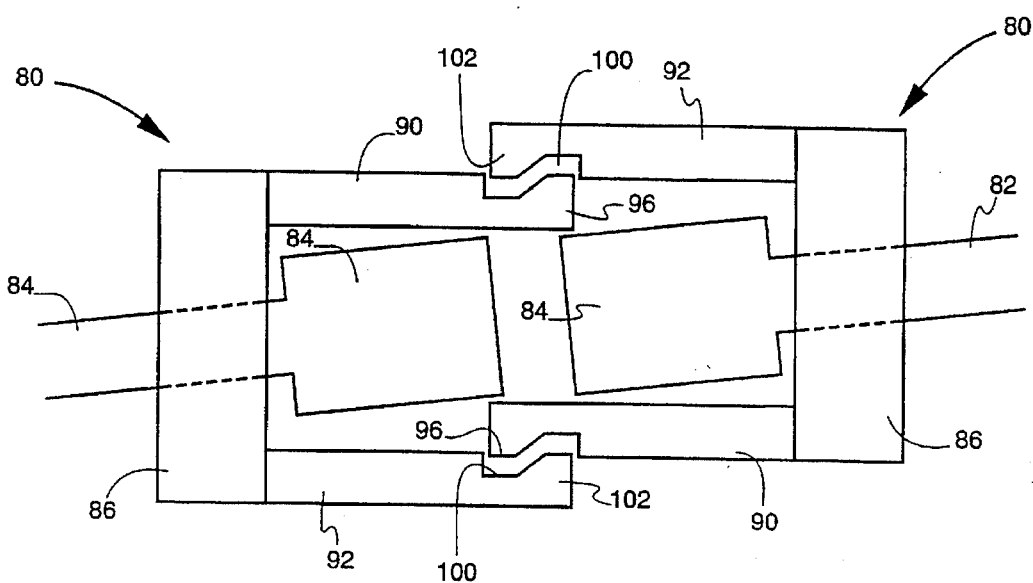
FIG. 11 illustrates a method of uncoupling the connector of FIG. 9 which is coupled to a substantially identical connector according to the present invention.

The connector 80 may be uncoupled from another substantially identical connector in one of two ways. First, the coupling nuts 86 may be rotated in opposite directions to disengage the latch arms 90, 92. Second, the connectors 80 may be pulled axially away from each other to pull the teeth from the grooves of latch arms 90, 92. Since latch arms 90, 92 are rigidly attached to center plate 88, the entire coupling nut 86 pivots relative to the connector body 82 to move latch arms 90, 92 away from their parallel orientation relative to the connector body 82. Such a method is best illustrated in FIG. 11 where latch arms 90 pivot inwardly toward connector body 82 while latch arms 92 pivot radially outward away from connector body 82. In this manner, teeth 96 are able to be pulled over teeth 102 as shown. Preferably, the connectors will not separate when axially pulled apart until experiencing a prescribed force which may vary depending on the particular application. When used to connect air lines on rail cars, such a force will preferably be greater than about 50 pounds.

Referring back to FIG. 9, the coupling nut 86 may be pivoted relative to the connector body 82 in a variety of ways to allow the coupling nut 86 to move away from its parallel orientation relative to the connector body 82 when being disconnected. Preferably, the connector 80 will be provided with at least one resilient member which will hinder latch arm 90 from moving toward the connector body 82. Shown in FIG. 9 are three resilient members 110, 112, and 114. Connector 80 may employ one, two or all of such resilient members at a time. Resilient members 110, 112, and 114 may be constructed of a variety of materials, such as a rubber pad, a spring (such as a Bellville spring, a disk spring, a coil spring, a compression device, a wave spring, or the like). Alternatively, latch arm 90 or center plate 88 may alternatively be constructed at least partially of a resilient material which would compress when latch arms 90, 92 are moved out of their parallel orientation with the connector body 82.

Resilient member 110 is positioned between latch arm 90 and the center plate 84. In this way, when two connectors are pulled axially apart, latch arm 90 will be subjected to a force having an inwardly-directed component which will cause resilient member 110 to compress at a preselected force and will allow the coupling nuts 86 to disengage. Resilient member 112 is placed between the center plate 84 and the center plate 88 and will compress when latch arm 90 experiences a force having a radially inward directed component, such as when two connectors are pulled apart. Resilient member 114 is positioned between a proximal surface 116 of center plate 88 and a securing member 118 which is securely fastened to the connector body 82. Resilient member 114 will compress when coupling nut 86 is moved away of from its parallel orientation relative to the connector body 82, such as when two connectors are pulled apart, thereby allowing the connectors to separate. The resilience of member 110, 112, and 114 may be adjusted to vary the amount of force required to separate two connectors.

Although the foregoing invention has been described in some detail byway of illustration and example, for purposes of clarity of understanding, it will be obvious that certain changes and modifications may be practiced within the scope of the appended claims.

What is claimed is:

1. A connector system comprising:
   a first and a second connector, each connector comprising an elongate connector body and a coupling nut rotatably coupled about the connector body, each coupling nut comprising a center plate and a pair of latch arms, with each arm having a groove therein to define a tooth at a distal end of each arm, wherein the arms are substantially parallel to the connector body, and wherein each connector further comprises at least one resilient member which resists movement of the arms away from their parallel orientation relative to the connector body; and
   wherein the first and second connectors may be connected by abutting the connector bodies and rotating the coupling nuts so that the grooves and teeth of corresponding arms mate with each other.

2. A connector system as in claim 1, wherein each groove is angled.

3. A connector system as in claim 1, wherein each connector body includes a pair of tabs and a pair of slots.

4. A connector system as in claim 1, wherein each connector body includes at least one electrical contact which is a signal or a power contact.

5. A connector system as in claim 1, wherein each connector body includes at least one fiber optic contact.

6. A connector system as in claim 1, wherein each connector is operably attached to a rail car.

7. A connector system as in claim 1, wherein both coupling nuts are substantially identical to each other.

8. A connector system as in claim 7, wherein each connector includes two halves which are defined by a central plane bisecting the connector body such that one half is a mateable image of the other half.

9. A connector system as in claim 7, wherein each of the arms is semi-cylindrical in geometry.

10. A connector system as in claim 9, wherein the groove in one arm of each of the connectors faces generally toward the connector body and the groove in the other arm of each of the connectors faces generally away from the connector body.

11. A connector system as in claim 1, wherein each connector body further includes a lumen extending therethrough, wherein a sealing member is at least partially held within the lumen, and wherein the lumen defines an airway.

12. A connector system as in claim 11, further comprising a hose connected to each connector body, with the lumen being aligned with the hose, and wherein each center plate is disposed about one of the hoses to rotatably couple the nut about the connector body.

13. A connector system as in claim 12, wherein the latch arms of each connector are rigidly attached to the center plate.

14. A connector system as in claim 13, wherein the resilient member is disposed between at least one of the arms and the connector body of each connector.

15. A connector system as in claim 13, wherein the resilient member is disposed between the center plate and the connector body of each connector.

16. A connector system as in claim 13, wherein the resilient member is disposed adjacent a proximal face of the center plate.

17. A connector system as in claim 1, wherein the latch arms of each connector are pivotally attached to the center plate.

18. A connector system as in claim 17, further comprising a pair of resilient members, and wherein the resilient members comprise a spring between each arm and the center plate.

19. A connector system as in claim 18, wherein the arms are pivotally attached so that one arm may be pivoted in a direction generally toward the connector body and the other arm may be pivoted in a direction generally away from the connector body.

20. A connector system as in claim 1, wherein the first and second connectors may be disconnected by rotating the coupling nuts until the mating arms are separated from each other or by axially pulling the connectors away from each other to separate the mating arms.

21. A connector system as in claim 20, wherein the resilient member is sufficiently resilient so that the connectors will separate with a force that is greater than about 50 lb when pulled axially away from each other.

22. A connector comprising:

an elongate connector body;

a coupling nut rotatably coupled about the connector body, the coupling nut comprising a center plate and a pair of latch arms, with each arm having a groove therein to define a tooth at a distal end of each arm, wherein the arms are substantially parallel to the connector body; and at least one resilient member which resists movement of the arms away from their parallel orientation relative to the connector body.

23. A connector as in claim 22, wherein the connector includes two halves which are defined by a central plane bisecting the connector body such that one half is a mateable image of the other half.

24. A connector as in claim 22, wherein each groove is angled.

25. A connector as in claim 22, wherein the connector body includes a pair of tabs and a pair of slots.

26. A connector as in claim 22, wherein the connector is operably attached to a rail car.

27. A connector as in claim 22, wherein each arm is semi-cylindrical in geometry.

28. A connector as in claim 27, wherein one arm faces in one arm faces generally toward the connector body and the groove in the other arm faces generally away from the connector body.

29. A connector as in claim 22, wherein the connector body further includes a lumen extending therethrough, wherein a sealing member is at least partially held within the lumen, and wherein the lumen defines an airway.

30. A connector as in claim 29, further comprising a hose connected to the connector body, with the lumen being aligned with the hose.

31. A connector as in claim 30, wherein the latch arms are rigidly attached to the center plate.

32. A connector as in claim 31, wherein the resilient member is disposed between at least one of the arms and the connector body, and wherein the center plate is disposed about the hose to rotatably couple the nut about the connector body.

33. A connector as in claim 31, wherein the resilient member is disposed between the center plate and the connector body.

34. A connector as in claim 31, wherein the resilient member is disposed adjacent a proximal face of the center plate.

35. A connector as in claim 22, wherein the latch arms are pivotally attached to the center plate.

36. A connector as in claim 35, further comprising a pair of resilient members, and wherein the resilient members comprise a spring between each arm and the center plate.

37. A connector as in claim 36, wherein the arms are pivotally attached so that one arm may be pivoted in a direction generally toward the connector body and the other arm may be pivoted in a direction generally away from the connector body.

38. A connector as in claim 22, wherein the connector body includes at least one electrical contact.

39. A connector as in claim 38, wherein the electrical contact is a signal or a power lead.

40. A method for coupling a pair of connectors, the method comprising:

providing a first and a second connector, each connector comprising an elongate connector body and a coupling nut rotatably coupled about the connector body, each coupling nut comprising a center plate and a pair of latch arms, with each arm having a groove therein to define a tooth at a distal end of each arm, wherein the arms are substantially parallel to the connector body, and wherein each connector further comprises at least one resilient member which resists movement of the arms away from their parallel orientation relative to the connector body;

abutting the connector bodies of the connectors; and rotating the coupling nuts in opposite directions until the grooves and teeth of corresponding arms mate with each other.

41. A method as in claim 40, further comprising rotating the coupling nuts in opposite directions until the mating arms are separated from each other to uncouple the first and second connectors.

42. A method system as in claim 40, wherein each connector body includes at least one electrical contact which are mated when the connectors are coupled.

43. A method as in claim 40, further comprising axially pulling the connectors away from each other to separate the mating arms and to uncouple the first and second connectors.

44. A method as in claim 43, wherein the connectors remain coupled until an axial force of greater than about 50 lb is applied to the connectors.

45. A method as in claim 40, wherein each connector body includes a lumen extending therethrough, and further comprising passing compressed air through the lumens.

46. A method as in claim 45, wherein a hose is connected to each connector body, with the lumen being aligned with the hose, and further comprising passing compressed air through the hoses.

47. A method as in claim 46, wherein each hose is connected to a rail car, and further comprising positioning the rail cars in close proximity to each other before coupling the connectors.

* * * * *